(12) United States Patent
Bradee

(10) Patent No.: US 7,131,000 B2
(45) Date of Patent: Oct. 31, 2006

(54) COMPUTER SECURITY SYSTEM

(76) Inventor: Robert L. Bradee, 6155 Murray Ct., Shorewood, MN (US) 55331

( * ) Notice: Subject to any disclaimer, the term of this patent is extended or adjusted under 35 U.S.C. 154(b) by 723 days.

(21) Appl. No.: 09/765,488

(22) Filed: Jan. 18, 2001

(65) Prior Publication Data

US 2002/0095571 A1    Jul. 18, 2002

(51) Int. Cl.
*H04L 9/00*        (2006.01)
(52) U.S. Cl. .................... 713/164; 713/165; 713/166; 713/167; 726/4; 726/5; 726/6; 726/7; 726/27; 726/28; 726/30; 707/9
(58) Field of Classification Search ........ 713/164–167, 713/201, 200, 178; 707/9, 10; 726/4–7, 726/27, 28, 30
See application file for complete search history.

(56) References Cited

U.S. PATENT DOCUMENTS

| | | | | |
|---|---|---|---|---|
| 5,235,642 | A * | 8/1993 | Wobber et al. | 713/156 |
| 5,305,456 | A | 4/1994 | Boitana | |
| 5,748,890 | A * | 5/1998 | Goldberg et al. | 713/202 |
| 5,774,551 | A * | 6/1998 | Wu et al. | 713/155 |
| 6,023,765 | A * | 2/2000 | Kuhn | 726/4 |
| 6,073,242 | A * | 6/2000 | Hardy et al. | 726/1 |
| 6,088,451 | A * | 7/2000 | He et al. | 713/201 |
| 6,158,010 | A * | 12/2000 | Moriconi et al. | 713/201 |
| 6,263,446 | B1 * | 7/2001 | Kausik et al. | 713/201 |
| 6,314,425 | B1 * | 11/2001 | Serbinis et al. | 707/10 |
| 6,574,736 | B1 * | 6/2003 | Andrews | 713/201 |

OTHER PUBLICATIONS

Along Lin, Integrating Policy-Driven Role Based Access Control with the Common Data Security Architecture, Apr. 1999.

* cited by examiner

*Primary Examiner*—Kim Vu
*Assistant Examiner*—Beemnet W Dada
(74) *Attorney, Agent, or Firm*—Kinney & Lange, P.A.

(57) ABSTRACT

A computer system provides system-wide computer application security using role-based identifiers. The programmer identifies secured functions within a software application using a hierarchical identifier. The hierarchical identifiers are grouped together into privilege sets. The privilege sets and other hierarchical identifiers are grouped together into job functions, which are in turn grouped into larger subsets called user roles. These user roles are stored in a data store. User identifiers are created. Each user identifier is linked to one user role in the data store. A surrogate identifier is created to correspond to each user role and is stored in the data store. The surrogate identifiers are not disclosed to the users. A user is given permission to access secured functions within an application by retrieving a surrogate identifier from the data store, which shares the same user role as the user. Access rights are determined using the surrogate identifier to validate permissions on a security provider.

9 Claims, 9 Drawing Sheets

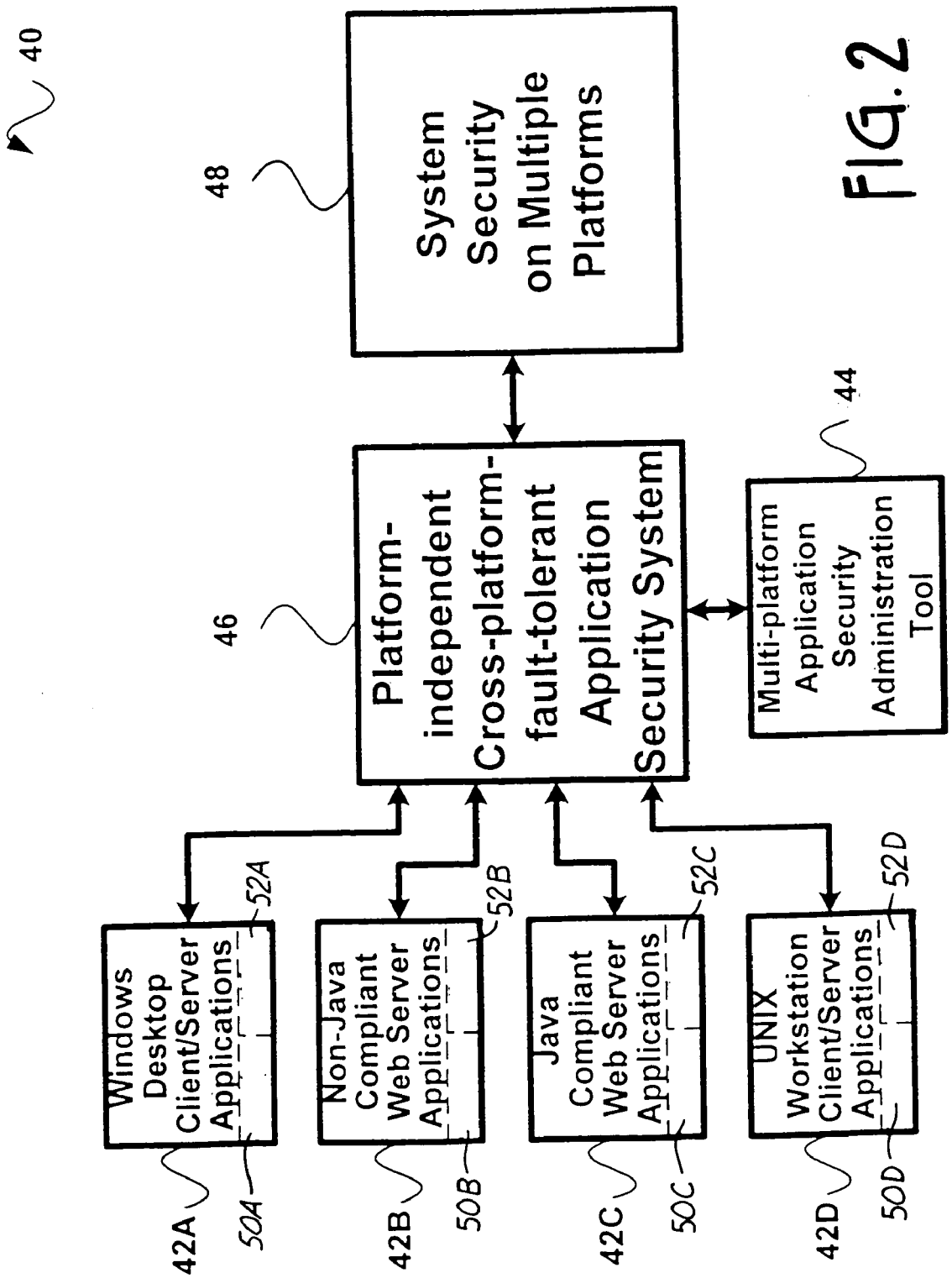

COMPUTER SECURITY SYSTEM

CROSS-REFERENCE TO RELATED APPLICATION(S)

None.

BACKGROUND OF THE INVENTION

The present invention generally relates to access control of functions contained in computer software applications. More specifically, the present invention relates to an apparatus and method for enterprise-level, platform-independent, cross-platform-fault-tolerant, extensible security of computer software applications.

The foundational application of the computer is the "operating system", which is comprised of numerous programs. The programs that comprise the operating system contain the subprograms that perform the fundamental operations of the computer. These subprograms correspond to common system operations such as writing information to a disk, displaying information on a computer screen or printing a report. Operating system subprograms are secured by the built-in security of the operating system, "built-in system security".

Generally, built-in system security does not perform "application security", which restricts access to specific functions, to sensitive screens of information, to specific fields on a screen or to specific reports within a software application. For example, built-in system security is designed to secure access to the entire payroll file, but it is not equipped to control access to a specific subset of information within that file. In other words, the built-in system security would not typically be able to restrict access to the records for a single department. Similarly, built-in system security is not designed to secure internal application functions such as the ability to edit specific records within a file, write a check, issue a purchase order, or modify a price list.

Generally, the granularity of control required by application security exceeds the scope of the security for which built-in system security is designed. For the purpose of this discussion, "system security" will be used to refer not only to the built-in security provided by the operating system, but also to the security provided by the various enterprise "directory services", which are special function databases used to store enterprise information such as a user IDs, passwords, system hardware information, and other frequently-accessed, seldom-changed information. Several examples of common directory services include the following: X.500, LDAP (lightweight directory access protocol), and Microsoft Active Directory Services. System security also refers to any system level security service provider.

For purposes of this discussion, "functions" will be used to refer to application software capabilities and other elements that typically require access control, not just to the business functions of an application. Other examples of elements that typically require access control include specific screens, web pages, data fields within screens, data fields within web pages, records within a file, rows within a database table and so on. Typically, each application handles access control to secure functions within the application. Secured "functions" are also sometimes referred to as "secured resources".

The exponential increase in computer usage, the increasing pace of software development, the interrelation of existing database technologies, and the heightened concern for data integrity and privacy have increased the need for an efficient and stable means for managing application security and control. In addition, the growth of computer technologies has dramatically increased the amount of administrative overhead required to maintain systems, creating a need for efficient management tools across applications and systems.

The most advanced application security solutions currently available do not operate on multiple operating systems concurrently. Furthermore, existing application security solutions cannot easily be extended to incorporate new systems, new platforms and new applications. In addition, existing solutions do not operate across operating systems and cannot function when the security provider fails. There is a need for scalable, enterprise-level, platform-independent, cross-platform-fault-tolerant, computer application security.

BRIEF SUMMARY OF THE INVENTION

The computer security system of the present invention provides a method for securing resources within applications. An embedded component is coded into the software application, and a platform coordinator program is loaded onto the machine where the software application executable runs. When a secured resource in the application is requested by a user, the embedded code passes the secured resource name to the platform coordinator. The platform coordinator passes the resource name, a user identifier and an authentication provider name to a security broker on a computer network. The security broker passes the user identifier to an appropriate authentication/authorization manager, depending on the authentication provider name passed. The authentication/authorization manager contacts the system security provider to authenticate the user. If the authentication is successful, the security broker reads its data store to determine which "surrogate user identifier" corresponds to the user's assigned "user role". The security broker then passes the surrogate identifier, password and secured resource name to any authentication/authorization manager which contacts its associated system security provider to determine if the surrogate identifier is authorized to access the secured resource. The results are passed back through the authentication/authorization manager to the security broker, then through the platform coordinator, back to the requesting application.

BRIEF DESCRIPTION OF THE DRAWINGS

FIG. 2 is an exploded modular view of the computer security system of the present invention showing multiple operating systems and applications supported by the computer security system of the present invention.

DETAILED DESCRIPTION

Figure 1A:
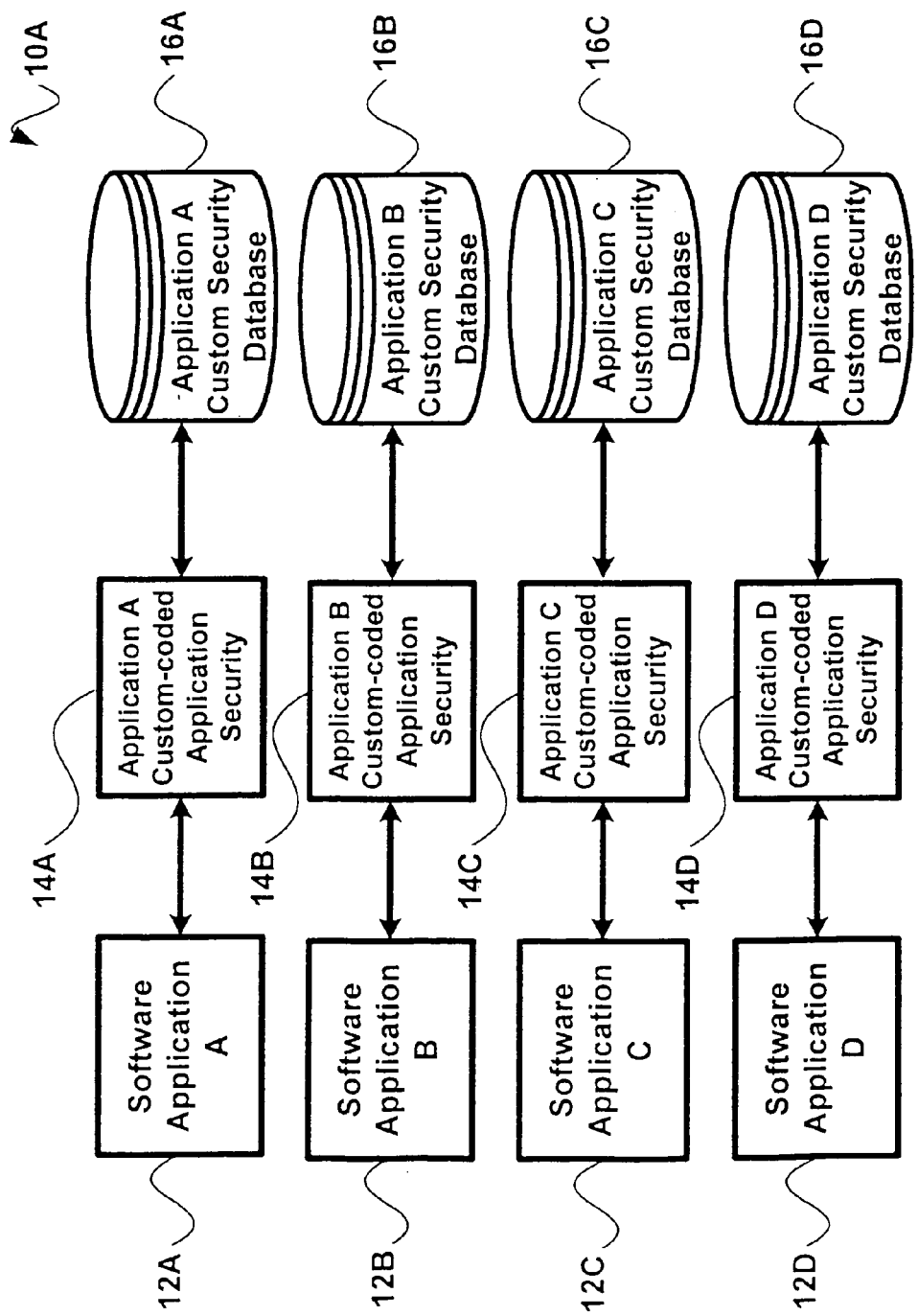
FIGS. 1A–1E are illustrations of prior art application security models.

FIG. 1A illustrates a prior art computer security system 10A in which application security is provided for each software application 12A,12B,12C,12D by a custom coded application security module 14A,14B,14C,14D, respectively. In the prior art security system 10A, application security 14A,14B,14C,14D may exist as a separate module or as code incorporated into a program of software application 12A12B,12C,12D. Typically, each individual software application 12A,12B,12C,12D contains custom-coded application security 14A,14B,14C,14D, which in either case interacts with its own custom security database 16A,16B, 16C,16D to determine access rights or permissions for each user. Unfortunately, though custom coded application security 10A is effective, it presents administrative difficulties in that users are required to remember separate IDs and passwords for each application 12A,12B,12C,12D. In addition, since each application 12A,12B,12C,12D requires custom-coded security 14A,14B,14C,14D, the maintenance and development costs are high and development delays are increased. Furthermore, management is complex in that administrative and user IDs must be maintained separately for each application. Finally, security and data integrity of existing systems may be threatened by each new security application 14A,14B,14C,14D in that coding errors or security holes may be introduced.

Figure 1B:
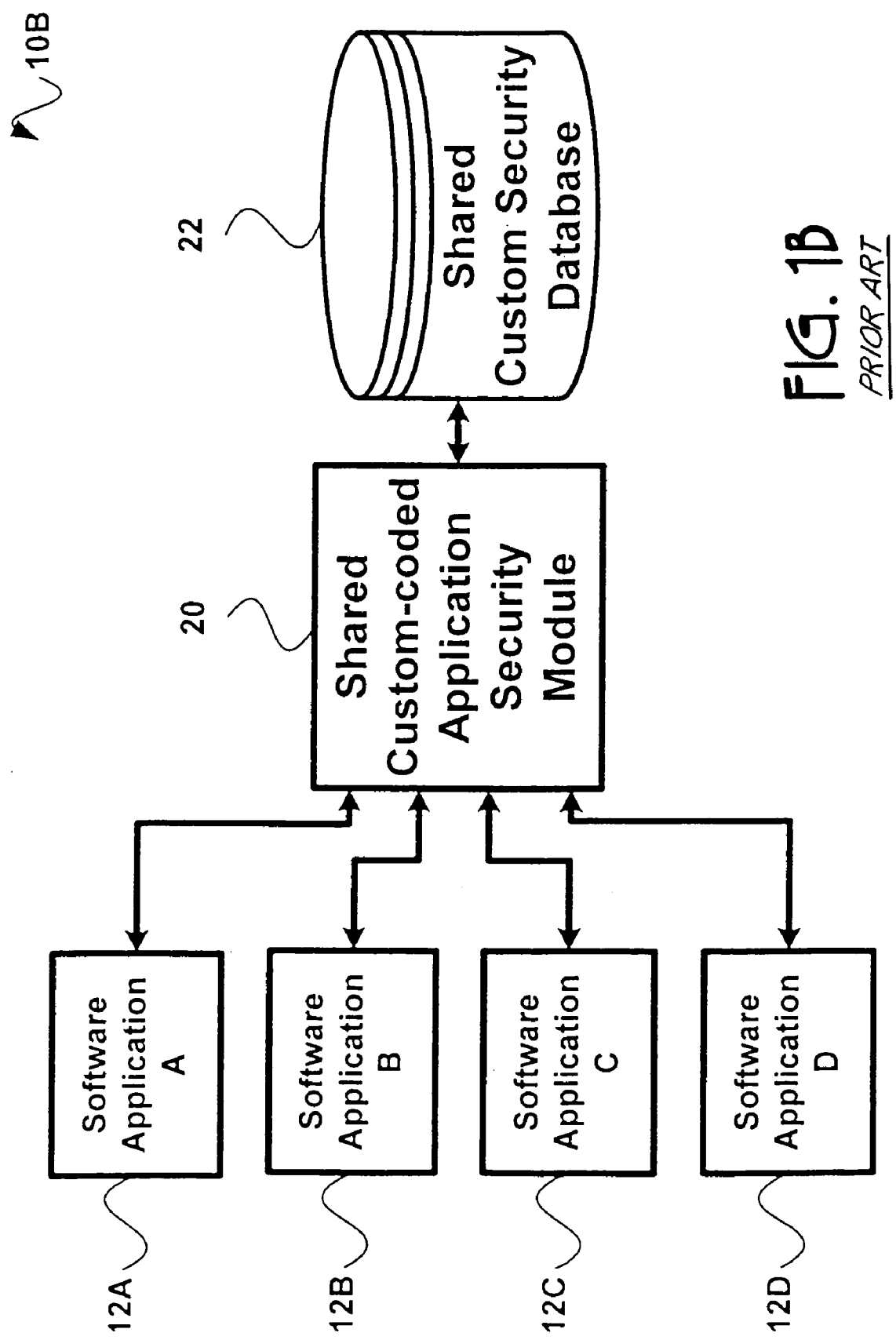

FIG. 1B illustrates a prior art computer security system 10B in which the application security is provided by a custom-coded application security module 20 that is shared by each application 12A,12B,12C,12D. Each application 12A,12B,12C,12D individually calls the security module 20, which uses a custom security database 22 to determine access rights or permissions. The custom security database 22 is thus shared by all applications 12A,12B,12C,12D. Though security system 10B constitutes an improvement over security system 10A, unwieldy application interdependencies are introduced, requiring system downtime to implement security database enhancements. In addition, security system 10B would require simultaneous modification of all applications 12A,12B,12C,12D to incorporate database enhancements.

Figure 1C:
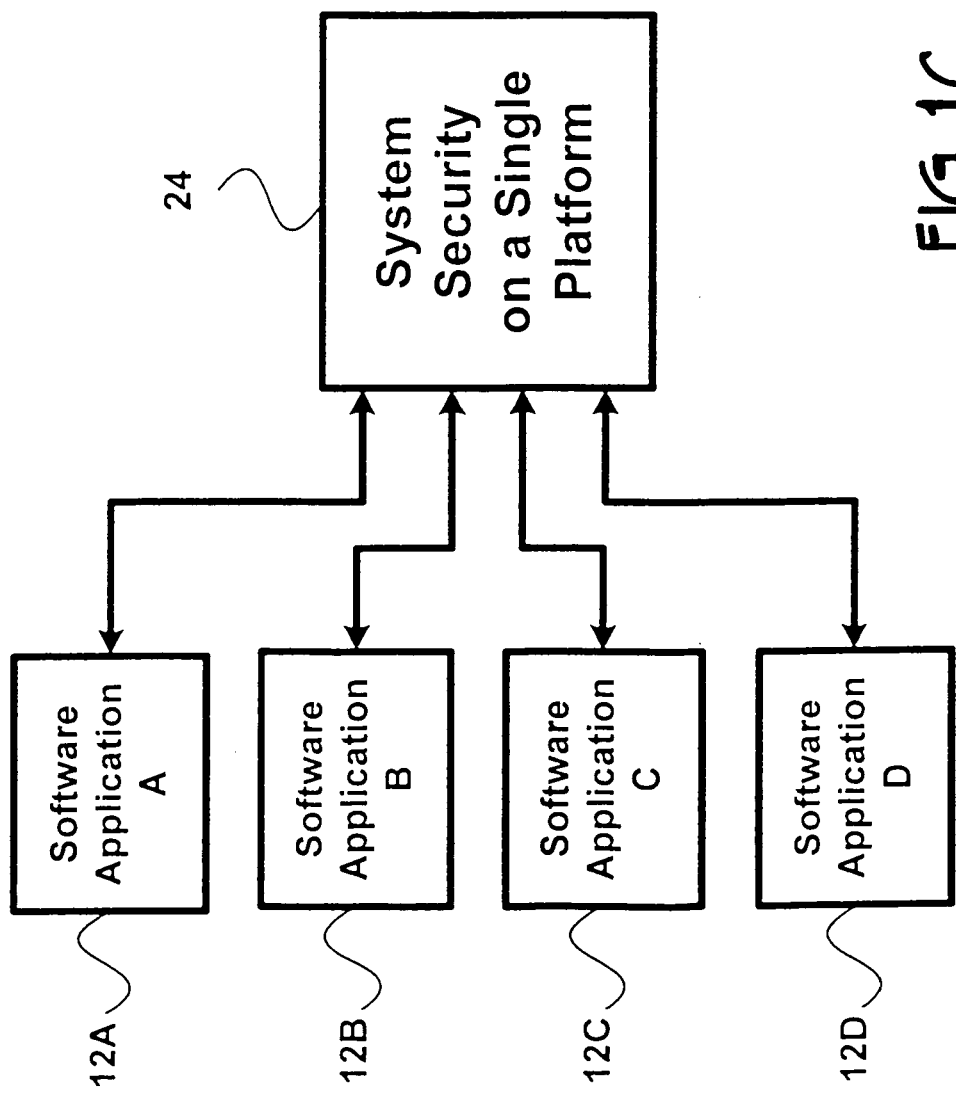

FIG. 1C illustrates a prior art computer security system 10C in which system security 24 is used. In this scenario, system security 24 refers to the operating system environment's built-in security. Each application 12A,12B,12C,12D individually contains calls to system security 24. The system security 24 of a single operating environment would have to be configured to recognize a new, user-defined class of secured resources, which will subsequently be used for application security. In this embodiment, one resource name in the new class is arbitrarily assigned to represent each secured application resource. This alternative requires extensive system security setup. Security department personnel would be required to use standard administration techniques and tools to authorize the appropriate user's access to each secured resource. A user ID and corresponding password must be defined in system security for every user that requires authorized access to an application resource, and that user is tied to that single platform or operating system. Once the system security 24 is configured, each application calls system security 24 and passes the required parameters. Parameters typically include user ID, password and secured resource name. System security 24 performs an authorization check and returns the result to the requesting application 12A,12B,12C,12D.

This approach requires complex coding techniques and extensive system security knowledge for implementation. Significant configuration of systems is required. Applications 12A,12B,12C,12D and system security 24 are tightly bound, such that changing or updating to a different system security provider requires significant coding changes. In addition, every user under this option requires an account on the system security provider 24. Hard-coding the security call to the security system interface locks the corporation into using only one system security provider for all application security across the entire enterprise. Any change to the resource names or system security call syntax requires program source code modification and quality assurance rechecks. This option results in the creation of redundant user accounts solely for application security when a user has no other need for account access. In other words, each security system provider 24 requires a user account in order to grant permissions. In corporations using multiple platforms, redundant user IDs and passwords may need to be created on different systems to provide fill access. In addition, system administration is complex and difficult due to the lack of an administrative tool.

Figure 1D:
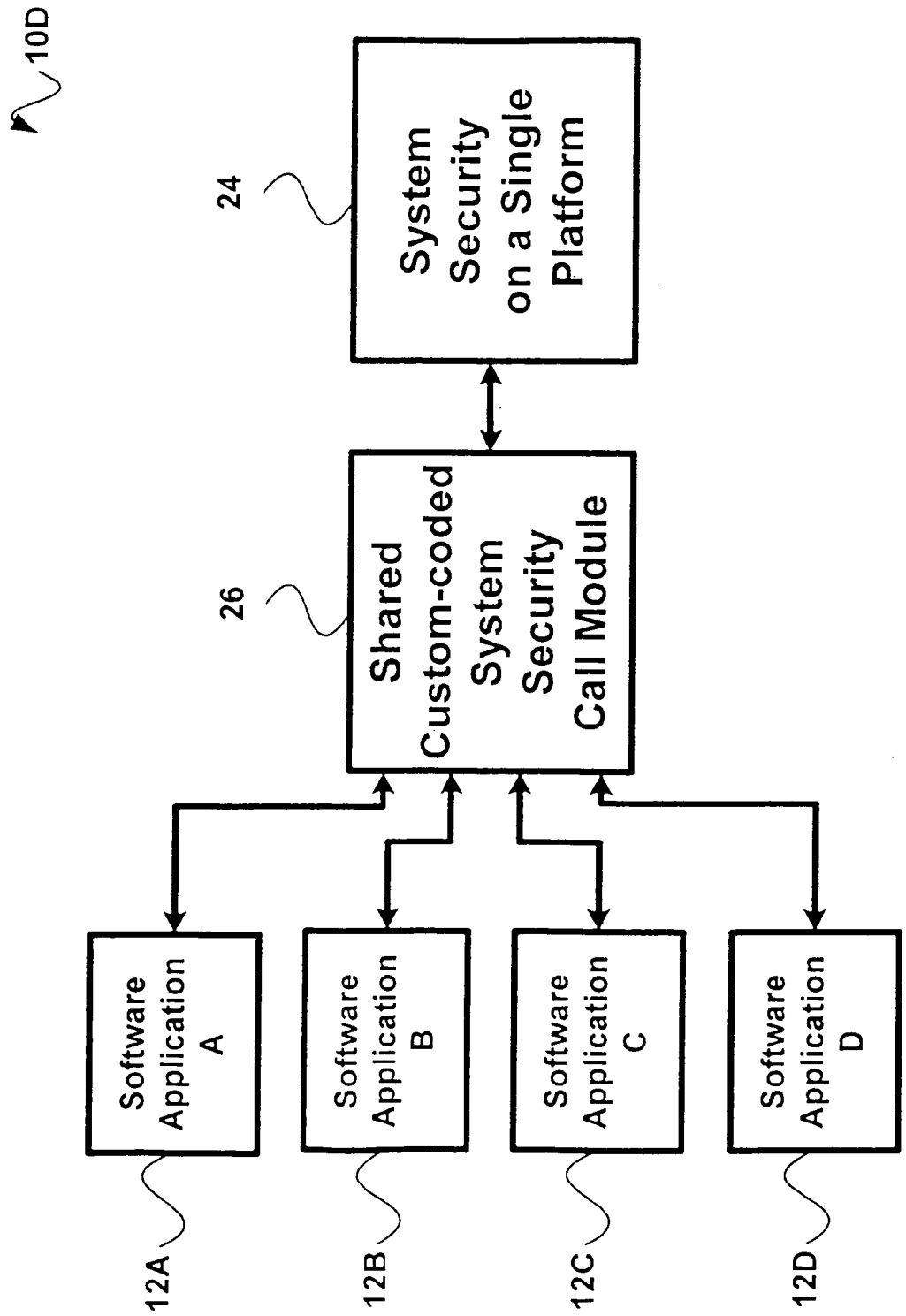

FIG. 1D illustrates a security system 10D in which each application 12A,12B,12C,12D calls a custom-coded security module 26 that is shared by all applications 12A,12B, 12C,12D. The module 26 in turn calls system security 24 and returns the appropriate permissions. While simpler than previous embodiments, this security system 10D still locks the corporation into a single security platform 24. Furthermore, any failure of the security call module 26 or the security system 24 will render applications 12A,12B,12C, 12D inoperable. This system 10D provides no backup in case of failure. In addition, custom coding is still required if the underlying system security 24 or its interface changes.

Figure 1E:
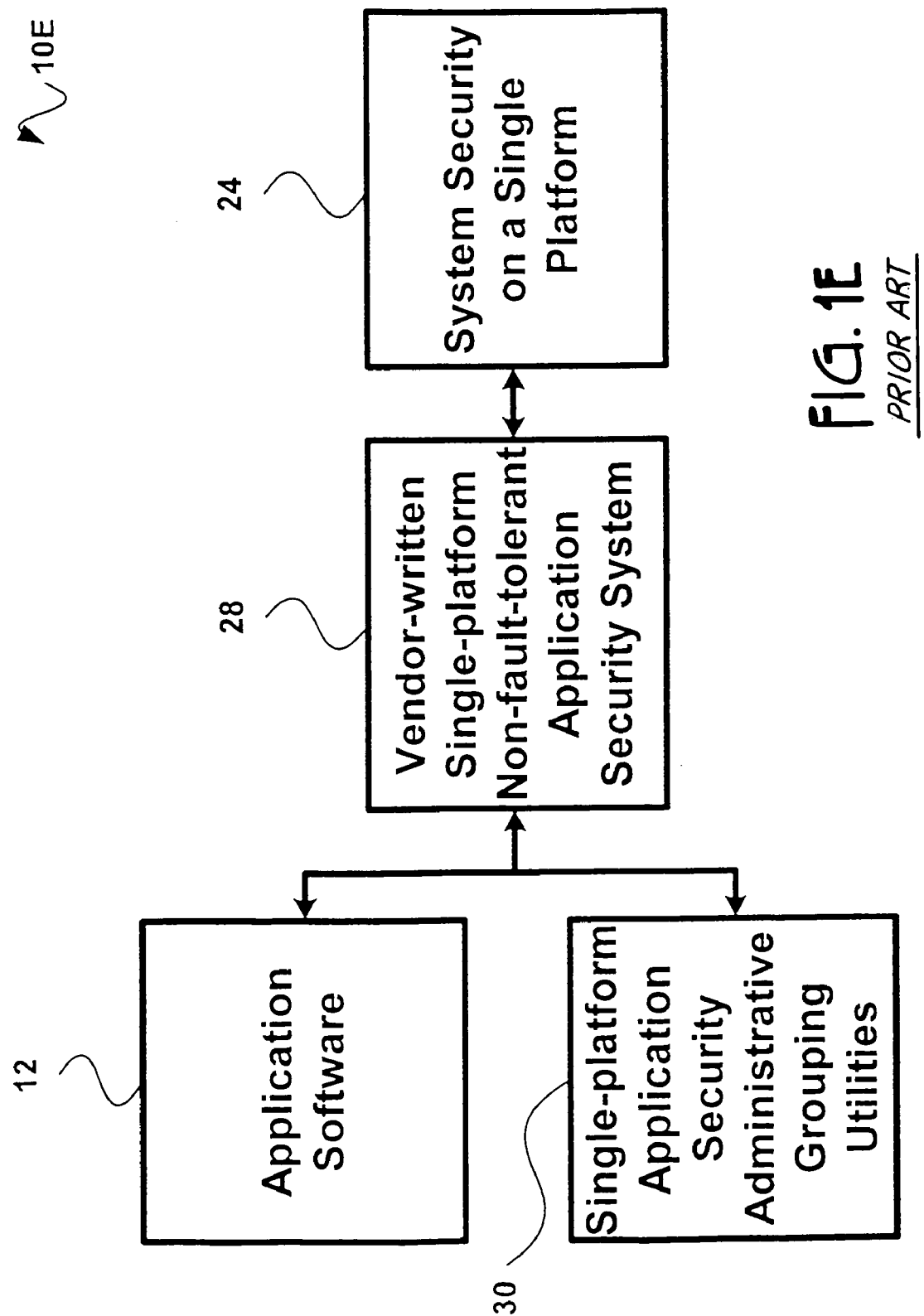

FIG. 1E illustrates another embodiment of a security system 10E, in which the application software 12 calls a vendor-written, custom-coded security module 28 that is shared by application 12 and/or a plurality of applications (not shown). The security module 28 in turn calls system security 24 and returns the appropriate permissions. This embodiment illustrates a single set of administrative utilities 30 for administering the security system 10E. Similar to the embodiment of FIG. 1D, security system 10E is susceptible to single point of failure in that an outage of the security module 28 or the security system 24 can take down the entire system 10E. In addition, custom-coding is required if the underlying system security 24 or its interface changes. This type of system is described in U.S. Pat. No. 5,305,456.

In all the above embodiments of the prior art 1A, 1B, 1C, 1D, 1E, program source code modifications are required to change the "mode" of application security controls within a program. The "mode" of a program is the logical operational state in which the program is running combined with system environment configuration settings. For example, a program may be said to be in "test", "quality assurance", "user acceptance", "production" or other operational mode depending upon local procedures and upon what stage the program has reached in the development process. System environment settings for programs in test mode, for example, are typically configured to connect to test databases to prevent corruption of production databases during the development process. When a program is moved "into production", system configuration parameters are modified to point the application at production databases. Program source code must be physically modified to cause the associated internal application security to begin using access control definitions specifically intended for "real world" or "production" use (i.e. "production mode") as opposed to those intended for use only during the development and testing process (i.e. "test mode").

FIG. 2 illustrates a modular view of a computer security system 40 of the present invention. The computer system 40 comprises: application software 42A,42B,42C,42D, administration tools 44, a security module 46, a system security provider 48, an embedded component 50A,50B,50C,50D, and a platform coordinator 52A,52B,52C,52D. The application software 42A,42B,42C,42D, the administration tools 44, the application security module 46 and the system security provider 48 reside on different computers and communicate via any industry-standard network protocol. Typically, the application software 42A,42B,42C,42D resides on computer workstations accessible to users.

The security administration tools 44 permit the entire system 40 to be administered through a single utility. The security administration tools 44 may reside on a web server on the network or on an individual computer workstation, provided that the computer, on which the administration tools 44 reside, has network access to the application security module 46. In addition, the administration tools 44 permit the administrator to monitor sessions, identify problems by logging sessions and to perform other administrative tasks such as management report generation. Generally, communication between the components of the application security system 40 is accomplished through TCP/IP Sockets or other such industry-standard inter-process/inter-program communications protocols, such as RPC (remote procedure call), SOAP (Simple Object Access Protocol) or named pipes.

In the security system 40, various software applications 42A,42B,42C,42D may simultaneously call the same application security module 46. The application security module 46 relies on the existing system security 48 to determine user permissions. The applications 42A,42B,42C,42D include applications from multiple operating systems, such that system calls from Microsoft Windows applications 42A, non-JAVA compliant web-server applications 42B, JAVA compliant web-server applications 42C, and UNIX applications 42D may each call the application security module 46 to determine access rights. Calls from other operating environments (not shown) are also possible. Each application 42A,42B,42C,42D includes an embedded component 50A, 50B,50C,50D appropriate to its operating environment.

To explain the operation of the security system 40, the application software 42A, for example, initiates a security event. The embedded component 50A and the platform coordination 52A capture the security event and pass information about the user and the requesting application software 42A to the application security module 46, which in turn calls the appropriate system security provider 48 to determine access rights or permissions. If the system security provider 48 is able to authenticate the user, the security module 46 passes the user's permissions to the embedded component 50A, which in turn passes them to the software application 42A.

The application security module 46 can receive and interpret security calls from any application 42A,42B,42C, 42D without regard to the operating system on which the application 42A,42B,42C,42D operates. For example, assuming application 42A invokes a security event, application 42A generates a security call to the application security module 46. The application security module 46 then routes the security call to the system security provider 48. The system security provider 48 checks the user against its authentication/authorization table (shown as reference numeral 70 in FIG. 3) and returns access authority or a permission to the application security module 46, which passes the permissions back to the requesting software application 42A, through the platform coordinator 52A and the embedded component 50A. In this embodiment of the present invention, each security call is made to the same application security module 46, regardless of the application 42A,42B,42C,42D or its operating system. The application security module 46 receives the security call, interprets the request, queries the appropriate system security provider 48, receives and interprets the response from the security provider 48, and returns a permission to the requesting application 42A,42B,42C,42D.

In the custom programming environment, a programmer can code a security call into an application as the program is in development, such that when a user attempts to initiate a secured function within an application 42A,42B,42C,42D, a security event is invoked and the security system 40 proceeds through the authentication/authorization sequence. Secured functions within an application are identified by the specifications to which the application 42A,42B,42C,42D is written. For instance, in an accounting environment, check writing ability or access to payroll information may be restricted to specific individuals. As the program is coded, access calls to these functions would invoke a security event. This security event would be captured by the embedded component 50, which would then proceed through the authentication/authorization process.

The application security embedded component 50A,50B, 50C,50D is a reusable programming component that is the part of the application security system 40. The embedded component 50A,50B,50C,50D allows application programs 42A,42B,42C,42D to access the functions of the application security system 40. The application security embedded component 50A,50B,50C,50D is implemented in a form appropriate to operating system of the application 42A,42B, 42C,42D. For example, in the Microsoft Windows environment, it is usually implemented as an "ActiveX" component. In a Java environment, it may be implemented as a "Java Bean" or an "EJB" (Enterprise Java Bean).

The programmer inserts a copy of the application security embedded component 50A during the coding of an application 42A, for instance. Then, when the application 42A requires an authorization decision to be made, the programmer simply invokes the appropriate function or "method" of the embedded component 50A supplying only the name of the secured resource. The embedded component 50 passes the secured resource name to the platform coordinator 52A.

Once the software application 42A,42B,42C,42D is coded and the embedded component 50A,50B,50C,50D is added, a platform coordinator must be installed. In the preferred embodiment, the platform coordinator 52A,52B,52C,52D and the software application 42A,42B,42C,42D should be installed on the same computer, respectively.

Figure 3:
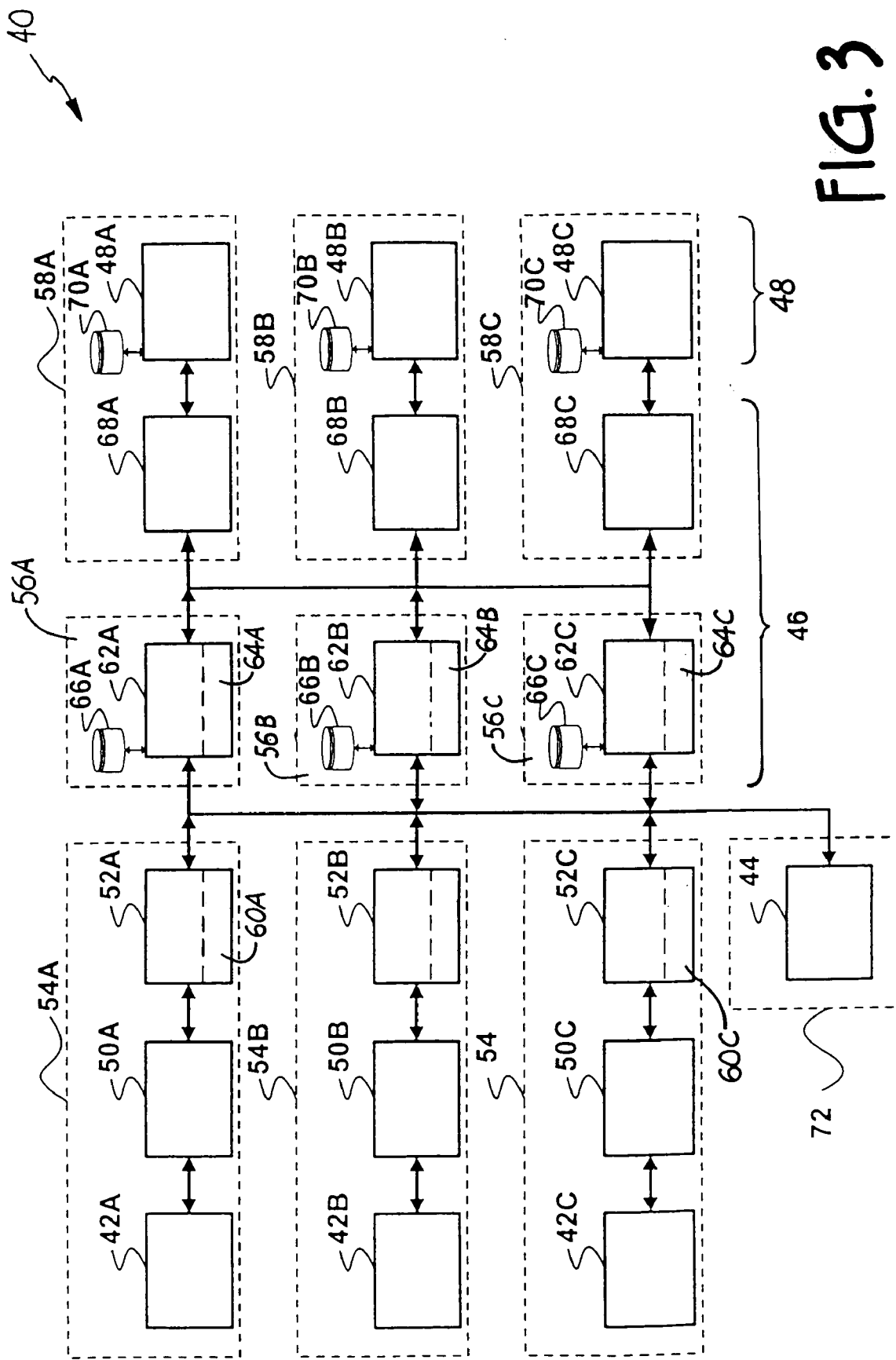
FIG. 3 is an exploded modular view of the the computer security system of FIG. 2 showing multiple applications and more specific components of the security system.

FIG. 3 illustrates a component view of the security system 40 having multiple software applications 42A,42B,42C, one set of administration tools 44, a security module 46 comprised of multiple security brokers 62A,62B,62C, and multiple, security providers 48A,48B,48C containing multiple authentication/authorization managers 68A,68B,68C. Each software application 42A,42B,42C resides on its own computer 54A,54B,54C together with its respective embedded component 50A,50B,50C and platform coordinator 52A, 52B,52C. Additionally, each platform coordinator 52A,52B, 52C contains its own cache 60A,60B,60C.

Typically, the applications 42A,42B,42C embedded components 50A,50B,50C and platform coordinators 52A,52B, 52C, each reside on one computer workstation 54A,54B, 54C, respectively. Application software 42B with corresponding components 50B and 52B reside on another computer workstation 54B, and so on. The application security module 46 consists of security brokers 62A,62B, 62C, their caches 64A,64B,64C, their data stores 66A,66B, 66C, and the authentication/authorization managers 68A, 68B,68C. Computer workstations 54A,54B,54C and computers 56A,56B,56C must be networked such that they can communicate via an industry-standard network protocol. The system security provider 48 is a network server, such as a Windows NT server, an IBM mainframe, an LDAP directory server, etc. FIG. 3 illustrates multiple security providers 48A,48B,48C, which may be any local-area-network servers or even a Wide-Area Network servers. The system security providers 48A,48B,48C reside on computers 58A,58B,58C, respectively. Computers 58A,58B,58C must be networked via any industry-standard network protocol with computers 56A,56B,56C. Generally, computer 58A,58B,58C contains its own data store or authentication/authorization table 70A, 70B,70C, which stores user names, passwords and their associated permissions or access rights.

The security module 46 may be comprised of multiple security brokers 62A,62B,62C, a cache 64A,64B,64C, and data stores 66A,66B,66C, and an authentication/authorization manager 56A,56B,56C, respectively. The security brokers 62A,62B,62C, the caches 64A,64B,64C and the data stores 66A,66B,66C reside on computers 56A,56B,56C, and the authentication/authorization manager 68A,68B,68C reside on computers 58A,58B,58C together with the system security providers 48A,48B,48C. Each security broker 62A, 62B,62C resides on a different computer 56A,56B,56C. Finally, each security provider 48A,48B,48C includes an authentication/authorization table 70A,70B,70C. Each software application 42A,42B,42C contains an embedded component 50A,50B,50C. Software applications 42A,42B,42C may run on different computers from their respective platform coordinators 52A,52B,52C. Authentication/authorization managers 68A,68B,68C may run on different computers from their respective security providers 48A,48B,48C. In the preferred embodiment, the software applications 42A, 42B,42C are stored with the platform coordinators 52A,52B, 52C on computers 54A,54B,54C, respectively. For example, if computer 54A were running on the Microsoft Windows operating system, a Windows application 42A would contain a Windows embedded component (such as an ActiveX component) 50A. In addition, the platform coordinator 52A would be installed on computer 54A.

The security broker 62A,62B,62C with its associated data store 66A,66B,66C resides on computers 56A,56B,56C, respectively. The security provider 48A,48B,48C, the authentication/authorization manager 68A,68B,68C and the authentication/authorization table 70A,70B,70C reside on the network computer 58A,58B,58C. In an alternative embodiment, associated data stores 66A,66B,66C can reside on database servers (not shown) on the network.

The administration tools 44 can reside on any of the already identified computers 54A,54B,54C,56A,56B,56C, 58A,58B,58C or on any other computer 72, provided the computer has network access to computers 56A,56B,56C. In the preferred embodiment, the administration tools 44 would be located on the Administrator's computer (not shown) so the administrator can easily utilize the tools 44, or on a network server such as a web server (not shown), so that they can be accessed from any network computer.

The arrows connecting the various components represent authentication and authorization paths in the security system 40. As FIG. 3 illustrates, multiple authentication/authorization paths are available between computers 54A,54B,54C, computers 56A,56B,56C and computers 58A,58B,58C. Each of these arrows represents a potential path for authenticating or authorizing a user to the security system. While the administration tools 44 may be used to designate one primary path such that 56A may serve as the primary computer for hosting the primary security broker 62A, alternative paths remain available through 62B and 62C to authenticate or authorize a user should security broker 62A become unavailable.

Each security provider 48A,48B,48C functions in two distinct capacities: authentication provider and authorization provider. The authentication provider function validates the user ID and password of the user to authenticate that the user is a valid user. Authentication may also be performed using alternate authentication methods such as "smart cards", hardware tokens, software tokens, IP Addresses, digital certificates, etc. The authorization provider function determines the access rights or permissions available to the particular user within an application.

To further explain the operation of the security system 40, a Microsoft Windows client/server embodiment is presented as an example. A user turns on computer 54A at the start of the day. Computer 54A runs through its normal boot sequence. Assuming computer 54A is connected to a network, the user logs onto the network through the normal logon sequence. In the event of a dial-up connection, the user dials into a network via a modem or any other transfer protocol. In Windows for instance, the user might log on to a network through a network logon script using a user ID and password.

Once the user is authenticated and permitted access to the network by the security provider 48A, the user also has access to applications 42A residing on the user's computer 54A. When the user initiates a secured application function in application 42A, the corresponding embedded component 50A passes the name of the secured resource being requested, the "requested-resource", to the platform coordinator 52A.

The platform coordinator 52A prompts for the user ID, the password, and the name of the "authentication provider" 48A of the user. The authentication provider is the system security provider 48A which contains the user's account information and therefore can determine if the user ID and password are valid. The platform coordinator 52A then passes the user ID, the password, the name of the authentication provider 48A, the requested-resource name, and a date-time stamp in an encrypted authorization request to the security broker 62A.

Once the user ID, password and authentication provider name are received, the security broker 62A prepares an authentication request and passes it to the authentication/ authorization manager 68A, which queries the authentication provider 48A. If the authentication process succeeds, the authentication provider 48A notifies the security broker 62A, and the security broker 62A generates a session ID and an authentication token for the user ID and password of the requesting user. The security broker 62A stores the authentication token in its cache 64A, once the associated surrogate ID has been determined and authenticated. If authentication fails, the authorization request is sent back to the caller indicating that authentication has failed.

If authentication succeeds, the security broker 62A retrieves from its data store 66A, a surrogate ID and password which correspond to the user ID's assigned "user role". The surrogate ID and password are not disclosed to the user.

The surrogate ID and password are then passed to the authentication/authorization manager 68A, which queries the security provider 48A. The security provider 48A tests the surrogate ID and password against its authentication/authorization table 70A. If the surrogate ID and password are correct, the surrogate ID is determined to be authentic and the security broker 62A stores the authentication token and associated surrogate ID in its cache. Once the surrogate ID is authenticated, the authentication/authorization manager 68A queries the security provider 48A a second time to determine the surrogate ID's authorized permissions or access rights to the requested-resource. Alternatively, the surrogate ID, password and resource name can be authenticated/authorized in one pass by passing all three to the security provider 48A at the same time. This alternative would reduce network traffic and security provider workload by reducing the authentication/authorization of the surrogate ID to one call to the security provider 48A, instead of two. The returned permissions, along with the authentication token and session identifier, are returned by the authentication/authorization manager 68A, in an encrypted message, back to the security broker 62A. The security broker 62A passes the information, in an encrypted message, back to the platform coordinator 52A, which decrypts the message and stores the authentication token, the session identifier and the name of the authorized requested-resource in its cache 60A. The platform coordinator 52A passes only the permissions back to the embedded component 50A, which in turn passes them back to the user application program logic 42A. The user application program logic 42A interprets the permissions in relation to the requested resource, permitting or denying access appropriately.

As described above, the platform coordinator 52A maintains a cache 60A of previously authorized secured resources. When the platform coordinator 52A receives an authorization request, it performs two checks against its cache before sending the request to the security broker 62A. First, the platform coordinator 52A checks its cache 60A for a valid authentication token. If present, the token is passed in place of user ID and password, thereby eliminating the need for the authentication/authorization manager 68A to perform an authentication, assuming the token is still valid and has not expired. Second, the platform coordinator 52A searches its cache 60A for the requested secured resource. If a matching entry is found and if the entry has not expired, the permissions contained in the cache 60A are passed back to the embedded component 50A, and no call is made to the security broker 62A.

Each security broker 62A,62B,62C, in addition to a data store 66A,66B,66C, contains a cache 64A,64B,64C for storing tokens. Once a user ID and its surrogate ID are authenticated, a token is stored in cache on the security broker 62. Future secured resource requests can be authenticated by comparing the information received from the requesting application 42A with the information in the cache 64A. If the token in cache 64A is still valid (i.e. has not expired), the security broker 62A can authenticate the request, thereby minimizing network traffic and authentication requests to the security provider 48A. If the administration tools 44 are used to change permissions in the data store 66A of security broker 62A, the permissions are changed simultaneously in the data stores 66B,66C of other security brokers 62B,62C and in the authentication/authorization tables 70A,70B,70C of the security providers 48A,48B,48C. Further, the platform coordinator cache 60A is updated so that the next secured resource request will trigger re-authorization. In the preferred embodiment, a cached authentication token or authorized secured resource will expire on its own after a certain amount of time (such as 4 hours), requiring a full authentication or authorization before proceeding, once a token or resource entry has expired. If the token has not expired, the token and session identifier are passed in place of user ID, password and authentication provider name. If the requested resource is found in the platform coordinator's cache 60A as an authorized resource, the cached permissions are passed back to the embedded component 50A without contacting the security broker 62A.

If an authentication token is passed, the security broker 62A compares the authentication token and session identifier received against its own cache 64A to determine the user ID, authentication provider and surrogate ID corresponding to the token. As with the cache 60A of the platform coordinator 52A, in the preferred embodiment, a cached token stored in the cache 64A of the security broker 62A will expire after a certain amount of time (such as 4 hours) allowing dead entries to be purged from the cache 64A once a token has expired. Furthermore, in the preferred embodiment, any changes impacting permissions associated with a user ID or surrogate ID are made through the administration tools 44, causing that user's corresponding authorizations to expire in the cache 60A of the platform coordinator 52A. Thus, changes to permissions are effected system-wide as soon as the changes are entered in the security system 40 using the administration tools 44.

If the authentication token is not expired, or if authentication of the user identifier has succeeded, the security broker 62A retrieves from its data store 66A or cache 64A, the surrogate ID and password which correspond to the user ID's assigned "user role". The surrogate ID and password are not disclosed to the user. The surrogate ID and password are then passed to the authentication/authorization manager 68A, and the associated permissions are returned through the normal authorization process.

The security system 40 of the present invention does not rely on the user ID beyond the initial login. Once the user ID and password are authenticated, the user is identified by the surrogate ID and associated user role. All subsequent permission requests are granted or denied based upon that surrogate ID, not the individual user ID. Thus, if a particular system becomes unavailable, the security module 46 can pass the surrogate ID to another platform and validate permissions through the alternate platform. In an alternative embodiment, the security brokers 62A,62B,62C can monitor the status of the authentication/authorization manager 68A, 68B,68C. If one of the authentication/authorization managers 68A,68B,68C or their associated security providers 48A,48B,48C become unavailable, the security brokers 62A,62B,62C will immediately become aware and route future security requests through alternative paths. If one of the authentication/authorization managers 68A,68B,68C or security providers 48A,48B,48C come back on line, they will register with the security brokers 62A,62B,62C so that the security brokers 62A,62B,62C can once again route permissions requests through normal paths.

As shown in FIG. 3, if security broker 62A is unavailable, the platform coordinator 52A can send the authorization request through one of the other security brokers 62B,62C, which may be running in a different operating system environment, such as UNIX or IBM mainframe. In the preferred embodiment, the platform coordinator 52A would send all requests through one of the security brokers 62A, 62B,62C designated through the administration tools 44 as the primary security broker, which maybe running in the same operating system environment as the requesting application 42A or in a different operating system environment. For example, a Windows workstation may call a Windows security broker designated as the primary, or may call an alternate security broker running in UNIX, IBM mainframe or another operating environment if the primary security broker is not available.

During system setup, the administration tools 44 are executed to configure the application security module 46. First, a user ID and security provider 48A,48B, or 48C are entered by hand and checked for validity. Alternatively, a user list is requested from the authentication providers 48A,48B,48C via a request passed to the associated authentication/authorization managers 68A,68B,68C. "Filter" parameters may be used to limit the size of the returned list by limiting their contents to only those IDs that match a specified "wildcard" string, "regular expression" or a given list of "properties". The administrator then determines which of the users will be granted permissions to secured resources in the security system 40. The administrator selects those user IDs from the user list or enters them by hand and adds them to the data store 66A (each added user ID is also added, or "replicated" to the other data stores 66B,66C automatically by the administration tools 44).

Then, the administration tools 44 are used to create "secured resources", which are basic elements to which authorization permissions can be assigned, corresponding to secured "functions" within a software application 42A,42B, 42C. Alternatively, secured resources may include fields in a web page or even access to a particular web page. Similar to a "file path" or "hierarchical directory structure", the administration tools 44 identify a secured resource by a hierarchical definition (e.g. "\["Application"]\[application mode]\[application name]\[application entity type]\[entity name]\[qualifier]\ . . . "). An example of such a secured resource in an accounting software package might look like the following: "\Application\Production\Accounting\ Function\Issue_Purchase_Order\"). Other syntax or terminology may be used. The syntax indicated throughout this document is for illustration purposes only, and may vary in actual implementation.

The hierarchical definition identifies the hierarchy of the secured resource, whether that secured resource is a function, a field, a set of fields, or any other element within the application. The secured resource may also be related to a type of function such as "write_a_check" or even a range of values such as "less than $300." Thus, the administration tools 44 can be used to limit access to a field, or to a function by identifying the field or function and specifying the appropriate permission such as "read only access", which allows the field to be viewed but not changed. In the preferred embodiment, the administration tools 44 define permissions to secured resources either to allow access or to deny access to a specific "function".

The administration tools 44 are then used to create "privilege sets", which are sets of secured resources, belonging to the same application, that are grouped together for access authorization purposes. A privilege set is usually used to define a set of resources within an application that will be authorized to a specific category of application users.

One or more privilege sets may be grouped together to form supersets called "job functions." Job functions may also contain individual secured resources as well as privilege sets. Job functions incorporate multiple privilege sets in order to describe all access needed by a specific position type, according to the specific needs of the client. Multiple job functions can then be grouped into supersets called "user roles". A user role is used to specify access privileges that span one or more job functions. User roles may also contain individual secured resources and privilege sets in addition to job functions and other user roles. Privilege sets, job functions and user roles, thus created, are then similarly created automatically by the administration tools 44 on all other security brokers 62A,62B,62C and stored within their corresponding data stores 66A,66B,66C in the security system 40.

The administration tools 44 are then used to associate user IDs with their appropriate user roles in the data store 66A (and the associations are automatically replicated into the other data stores 66B,66C). Once the associations are complete, the administration tools 44 are used to create user IDs on the security providers 48A,48B,48C called "surrogate IDs". The surrogate ID is an actual user ID defined on the system security providers 48A,48B,48C, which is then used to represent all those who have a particular user role assigned to them. These surrogate IDs are not disclosed to the users.

Privileges or permissions corresponding to the user role are stored on the security providers 48A,48B,48C in terms of permissions granted to the surrogate IDs. These surrogate IDs are used by the security brokers 62A,62B,62C to determine access rights. Further, in the event of system failure of one of the security brokers 62A,62B,62C or one of the system security providers 48A,48B,48C, the surrogate ID maybe passed through an alternate security broker 62A, 62B,62C to one of the alternate authentication/authorization managers 68A,68B,68C to permit fail-over authorization. Using surrogate IDs to determine permissions and employing redundancy with regard to user IDs and surrogate IDs in the data stores 66A,66B,66C and with regard to surrogate IDs in the authentication/authorization table 70A,70B,70C of the security providers 48A,48B,48C permits multiple authorization paths for any security request. If any of the computers fail, authorization may still proceed through another avenue.

Since each data store 66A,66B,66C contains the user IDs and surrogate IDs for all users, the authorization process can be performed for application 42A (or any application 42B, 42C) through any of the security brokers 62A,62B,62C. The permissions associated with the surrogate ID relate to the user role, such that the user can be authorized by surrogate ID in the event of security provider 48A,48B,48C failure or security broker failure 62A,62B,62C. Thus, the security system 40 provides massive redundancy to support fault tolerance.

The user role is a system-wide set of application permissions, which determines access rights or permissions within applications 42A,42B,42C. A user role defines the privileges of users who have the same job responsibilities. Three examples of user roles are "UserRole_Accounting_Junior_ Clerk", "UserRole_Accounting_Senior_Clerk" and "UserRole_Accounting_Manager". Although many approaches are possible, the preferred method for building a user role starts with defining privilege sets which are then rolled up into job functions that make up a user role. "Multi-level Nesting" of elements is allowed at the job function, privilege set, and user role levels. For example, job function "Job-Func_Payroll_Management" might be set up to include "JobFunc_Payroll_Senior_Clerk" which itself includes "JobFunc_Payroll_Junior_Clerk".

Secured resource definitions can be a range of values instead of literal or specific values. For example, the Accounts Payable secured resource "\Application\Production\AP\Issue_Purchase_Order\<Range1>\may be assigned a range of values in which "<Range1>" is defined using a regular expression such as: "<Range1>is greater than 0.00 AND less than or equal to 10,000.00". In these examples, the "<>" notation is being used to represent a variable. Similarly, "\Application\Production\AP\Issue_Purchase_Order\<Range2>\ is defined with "<Range2> greater than 10,000". Assuming that User A is only authorized to the "\Application\Production\AP\Issue_Purchase_Order\<Range1>\" resource, when the accounts payable application sends the secured resource: "\Application\Production\AP\Issue_Purchase_Order\9000.00", the application security system evaluates "9000.00" against <Range1> and determines that privileges assigned to this secured resource should be used to evaluate this request. When User A attempts to issue a $5,234.01 purchase order, the request will be allowed. By the same token, if User A attempts to issue a purchase order of $10,000.01 the request will be denied.

Range definitions save administrative work. Specific permissions need not be defined for each possible dollar value for the security system to operate. In other words, the administrator need not define a separate permission for each possible value from $0 to $10,000.00 in order for User A to issue a purchase order within that range. The application security module 46 can interpret ranges of values for purposes of determining permissions with the applications 42A,42B,42C.

The present invention simultaneously supports both "policy-based" and "role-based" access control definitions. This may be described as "policy-driven role-based access control". Thus far, only role-based access control has been described. Role-based access control relies upon permissions specifically granted by attaching a user to a user role, using the administration tools 44, as described above. Policy-based access control on the other hand, relies on the evaluation of one or more logical conditions to determine authorization permissions.

Policy-based access definitions can be used in place of role-based definitions to dramatically reduce required administration. For example, in some instances, it may be desirable that a user have access to their own record in the Human Resources (HR) data base, but have access to no others. It obviously would be too labor-intensive to define a secured resource corresponding to every single employee's database record. Using policy-based access control, a secured resource can be defined that includes a variable for the requested employee number: "\Application\Production\HR\Employee_Record\<Requested_Empl_Number>\" where "<Requested_Empl_Number>" is the variable name. The actual employee number of the record being requested is passed by the calling program in place of the variable "<Requested_Empl_Number>". Using the administration tools 44, a stored procedure is pre-defined to the security system 40, which is capable of retrieving the employee number of the currently signed on user from the appropriate database and placing it in variable "<User_Empl_Number>". A policy-based access control condition is then attached to the resource "\Application\Production\HR\Employee_Record\<Requested_Empl_Number>\", and defined as follows: "If<User_Empl_Number>=<Requested_Empl_Number>Then Allow". When an employee requests access to their own HR record, authorization is evaluated against the secured resource "\Application\Production\HR\Employee_Record\<Requested_Empl_Number>\". The stored procedure associated with <User_Empl_Number> is invoked, the current user's employee number is placed in <User_Empl_Number>, the policy-based access control condition is evaluated and access is allowed.

In another example of policy-based access control, the security system 40 can evaluate dynamically updated conditions to determine whether a user should be permitted access to a resource. For example, a research web site might provide free access to a limited number of pages to all users. Then, upon supplying certain information such as e-mail address, a free user account is generated automatically on the system, and a greater level of access to available research is permitted. Finally, if the user agrees to pay a certain premium, additional access rights are granted. In this example, all users have access to general information on the system. The creation of the user account grants the user "guest" access privileges on the system, providing access to limited additional information. Finally, "paid" access privileges would provide additional rights. This is accomplished through the following method. The "paid" status of a user's account is dynamically updated in the security system 40. The security system 40 dynamically updates the user's account in the data store 66A of the security broker 62A during the web site's operation using functionality supplied by the embedded component 50A. The user's access rights are determined, not by user name and specifically-granted privileges as with role-based access control (as described above), but by a conditional check based upon a field in the user account record indicating whether they have paid or not. The more-specific procedures detailed in the preceding paragraphs could be readily applied to support this authorization scenario.

Figure 4:
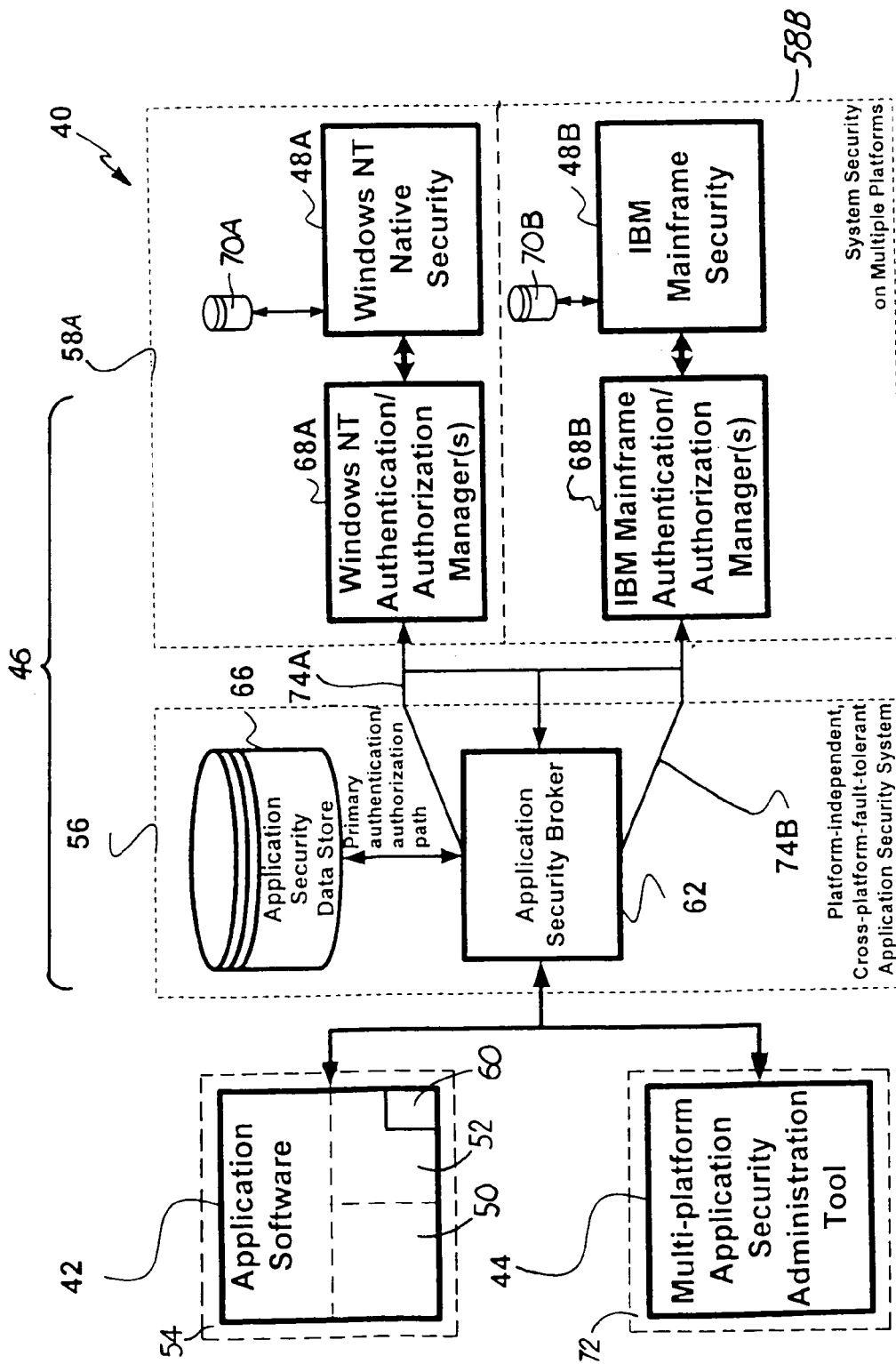
FIG. 4 is an exploded modular view of the computer system security of FIG. 2 showing the interaction between the components of the security system.

In FIG. 4, the security system 40 comprises: a workstation computer 54 with installed application software 42 containing an embedded component 50 and an installed platform coordinator 52, and other computers 72,56,58A,58B containing the administration tools 44, security module 46, and security providers 48A,48B. An arrow connects the workstation computer 54 to the security broker 62. The security broker 62 is similarly connected to its data store 66. The security broker 62 is connected to each authentication/authorization manager 68A,68B. Each authentication/authorization manager 68A,68B is connected to its own security provider 48A,48B.

The security module 46 is comprised of a security broker 62, a cache 64, and a data store 66 and an authentication/authorization manager 68. Typically, the security broker 62 will have more than one possible authentication/authorization path 74A,74B. If one security provider 48A,48B or authentication/authorization manager 68 is unavailable, the security broker 62 will route authentication/authorization requests to another authentication/authorization manager 68. Similarly, the platform coordinator 52 can route requests to an alternate security broker 62A,62B,62C if one of them is not available. Generally, the application software 42 calls the application security module 46. The security broker 62 receives the call and retrieves a surrogate ID from its own data store 66. The security broker 62 will attempt to pass the information through the primary authorization path 74A. If the Windows NT security provider 48A is unavailable, security broker 62A will determine that security provider 48A is no longer available and then route the surrogate ID through an alternate authorization path 74B to an authentication/authorization manager 68B (operating in a different platform). Authorization can then proceed as normal.

Figure 5:
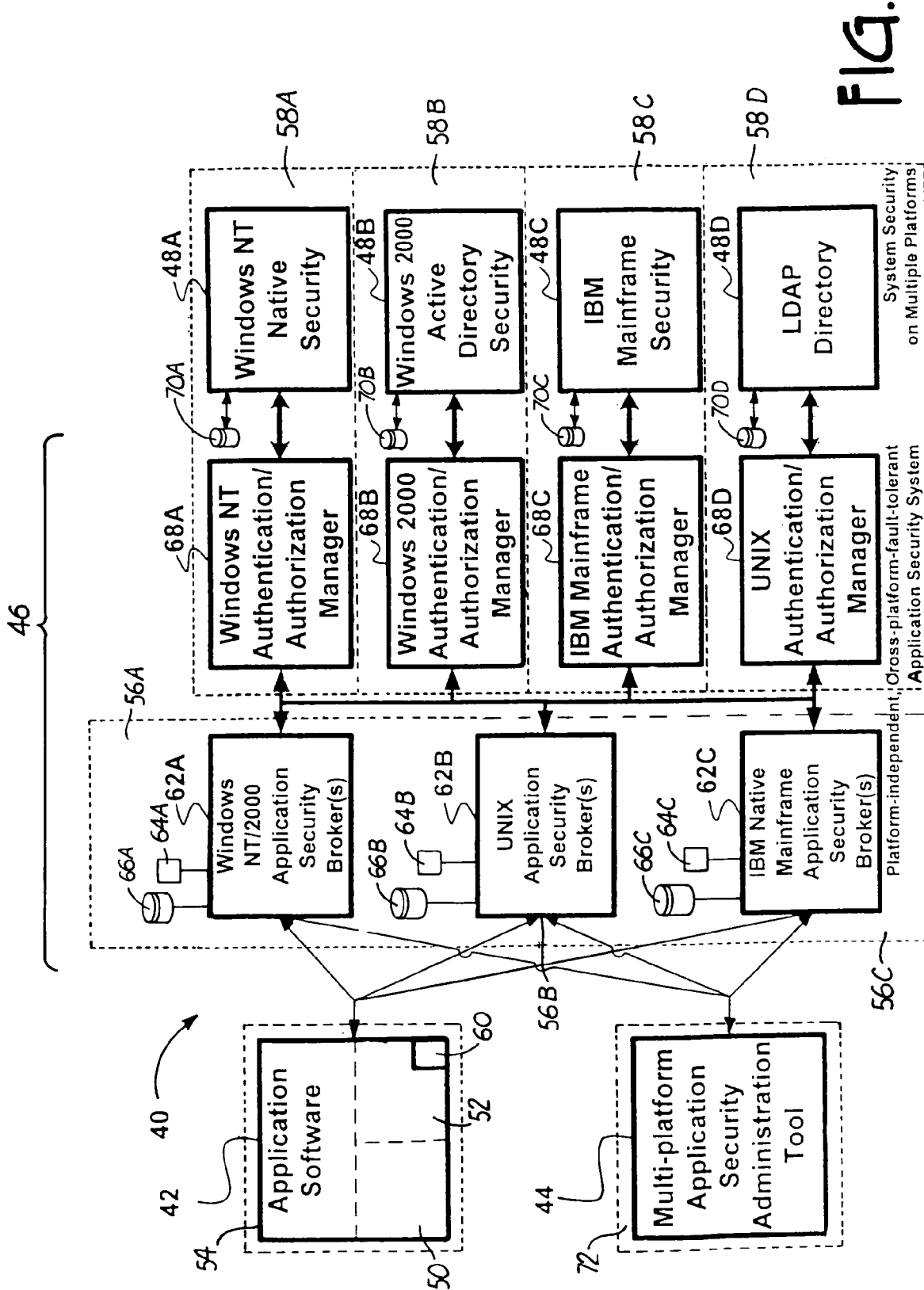
FIG. 5 is an exploded modular view of the security system of FIG. 2 showing the interaction between the components of the security system.

FIG. 5 further illustrates the interrelation of the various elements of the system. The security system 40 illustrated in FIG. 5 shows application software 42, embedded component 50, and platform coordinator 52 in one computer 54. The administration tools 44 are shown on another computer 72. Arrows connect the computer workstation 54 and the administration tools computer 72 to each of the security brokers 62A,62B,62C. Each security broker 62A,62B,62C has a cache 64A,64B,64C and a data store 66A,66B,66C. Arrows connect each of the security brokers 62A,62B,62C to the authentication/authorization managers 68A,68B,68C,68D. Each of these arrows represents a possible authentication/ authorization path for the security brokers 62A,62B,62C, 62D, the platform coordinators 52 and the administration tools 44 to use. Each authentication/authorization manager 68A,68B,68C is similarly connected to its own security provider 48A,48B,48C,48D. Multiple platforms for security brokers 62A,62B,62C, authentication/authorization managers 68A,68B,68C,68D and security providers 48A,48B,48C, 48D are shown to illustrate the extensibility of the system. It is also possible that multiple, redundant instances of a given security broker type may be implemented to provide fail-over and load-sharing. For instance, three Windows 2000 security brokers might be implemented to supply additional scalability and fault tolerance.

Additional security providers 48 may be added simply by installing a new security provider on the network, and adding the new security provider to the data stores 66 via the administration tools 44. If another security provider 48 is added to a corporation's network (such as a mainframe server or an LDAP server), the administrator can add the new security provider 48 and the application security module 46 to the system 40 without interruption to the security system 40. To the other elements in the system 40, additions are transparent and can be implemented on the fly with minimal setup and configuration.

Similarly, new applications 42 can be added to the security system 40 simply by installing an embedded component 50 in the application 42, and installing the platform coordinator 52 (shown in FIG. 3) on the same computer. The application security module 46 may be comprised of one or more security brokers 62 and one or more authentication/ authorization managers 68A,68B,68C along with their associated security providers 48A,48B,48C. Each security broker or set of redundant security brokers 62 may function within a different operating system (such as UNIX, Microsoft Windows, MAINFRAME, etc.) and on different computers within the same network. Each security broker 62 is managed simultaneously through the administration tools 44. Each security broker 62 can interact with one or more authentication/authorization managers 68, which in turn interact with one or more security providers 48. Each security broker 62 has its own data store 66 (as shown in FIG. 3).

The present invention allows all security parameters to be managed from a single set of administration utilities 44. All changes are implemented system-wide. Privileges may be specific (i.e. "NO ACCESS", "FULL ACCESS", "no check writing privileges", etc.) or they maybe general or over a range of values (i.e. "Check writing authority up to $300.00", "See public fields and not private fields", or "This user launches this application in 'test' mode only"). This flexibility allows security to be managed without the primary security provider 48 being available. Further, the policy-driven role-based security system 40 permits the other security brokers 62 to fail over to alternate security providers 48B or 48C, to determine permissions in the event of a failure of the normal security provider 48A.

The security system 40 incorporates the ability to support a plurality of operational modes within a plurality of software applications 42 simultaneously. Moreover, the present invention includes the ability to externally control the mode of each program without making any internal source code changes whatsoever or recompiling. A unique identification, in effect a "digital signature", may be assigned to, and embedded along with, each instance of the embedded component in order to uniquely identify the embedded component 50 at the time it is checked out by the programmer during development. This identification, along with the component's current operational mode, would then be registered with the application security system 40, using the administration tools 44. During processing, the embedded component 50 passes its unique identification to the application security system 40 which uses this information to determine the mode of the associated program 42. When the program 42 is moved into production, the mode of its associated application security is changed using the administration tools 44. No internal source code modification or recompiling is required. This is extremely advantageous from a Quality Assurance perspective in that no source code modification or recompiling is required in order to effect a shift to production application security. In the prior art, any such changes would typically require source code modifications resulting in the nullification of the Quality Assurance status of the program 42, requiring a complete re-certification of its Quality Assurance status. The present invention avoids all such problems by implementing "external mode control" of application security by allowing system administrators to control program mode independent of programming activities.

Thus, applications 42 operating in any computer environment (JAVA, Windows, etc.) can access the same security provider 48 to determine permissions. Further, the application security module 46, by interacting with the embedded component 50 can control access to individual fields or functions within an application, as well as access to the whole application 42. Unlike existing security systems 10, the security system 40 addresses application security enterprise-wide as well as security at the more-granular level of applications 42.

The security system 40 as described has numerous advantages over prior art systems. First, the Fail-over Mode provides a solution for authorization even in the absence of the normal security provider. Systems support, maintenance and troubleshooting can be performed without interfering with the user. In a software development environment, this fail-over solution can save a company costly business outages and safeguard crucial development time by preventing lapses in access to vital systems.

In addition, the security administration tools 44 centralize administration of the security system 40, such that permissions or access rights for users can be changed globally from one set of utilities 44. Permissions or authorization calls from specific programs 42 access updated permissions at the next secured resource request. An administrator could force a permissions update simply by changing permissions. Permission changes occur through the security broker 62, causing the broker 62 to perform permissions requests to update the cache. Thus, permission changes may be implemented immediately, system or enterprise wide.

The embedded component 50 permits the individual application to rely on a central application security provider for permissions and access rights. Standardizing the security calls and permissions, minimizes administration, coding and permissions errors. In the software development environment, the centralized security system 40 simplifies coding, reduces error checking requirements and reduces overhead.

As previously described, the security system 40 of the present invention is expandable in scope, such that components maybe added as needed to support additional security providers 48, platforms, etc. Since many companies rely on multiple security providers 48, allowing for new platforms and expanding capabilities is essential.

The administrative tools 44 provide a comprehensive, visual interface for maintaining, servicing and updating the security modules 46. Tools 44 permit automatic logging of events, management tracking and reporting. Unusual events or warnings relating to unauthorized access can generate messages via e-mail or across other media (such as pagers, etc.), and can trigger other security measures. In addition, the administrative tools 44 provide a mechanism for tracking, logging, identifying and reporting application-security-related information.

The business process or function that a particular application 42 function serves does not need to be known by the security provider 48. The system call simply returns the permissions or access authorization to the requesting program 42, and the program 42 can interpret the permission to determine access rights. The present invention automatically tracks and reports activity. It supports platform-independent security calls, such that any application operating on any supported operating system can generate a security call and receive a permission response. Application security can then be handled by multiple security agents, permitting fail-over support for users on the networks. Rather than having a user ID and password on all systems, the fail-over system relies on the user type based on a surrogate ID and associated user role to continue to provide access. Thus, individual network administration is minimized through standardization of user types across platforms.

Applications and users are protected from "single point of failure" vulnerability. In other words, if one security module 46 fails, another can provide permissions authorization for the user type (user role/surrogate ID), permitting the user to continue working. Since all security requests are processed through the security module 46, failure at a single point would be catastrophic. In this invention, system security providers 48 provide fail-over support through standard user-type naming conventions (user roles), and security modules 46 provide fail-over support to establish a secure, extensible, stable, fault-tolerant, and real-time enterprise-wide security system 40.

Although the present invention has been described with reference to preferred embodiments, workers skilled in the art will recognize that changes may be made in form and detail without departing from the spirit and scope of the invention.

The invention claimed is:

1. A method for providing computer application security, the method comprising:
   identifying secured resources within a software application;
   grouping secured resources into user roles stored on data stores of a plurality of security brokers, wherein grouping secured resources into user roles comprises:
      establishing in the data stores links to each of the secured resources;
      selecting the links corresponding to related secured resources;
      grouping the selected links into user roles; and
      storing the user roles in the data stores;
   generating a plurality of surrogate identifiers in the data stores of the security brokers, each surrogate identifier being associated with one user role;
   associating users with user roles, each user being associated with one user role; and
   determining access rights to the secured resources for each user according to a corresponding surrogate identifier without disclosing the corresponding surrogate identifier to the user, the corresponding surrogate identifier being associated with the user role of the user, determining access rights further comprising:
      receiving a permissions request from a workstation and routing the permissions request to one of a plurality of security providers with one of the security brokers;
      authenticating a computer user as a valid user with one of the security providers; and
      authorizing the user to access one of the secured resources with one of a plurality of security providers.

2. A method for providing computer application security, the method comprising:
   identifying secured resources within a software application;
   grouping secured resources into user roles stored on data stores of a plurality of security brokers, wherein grouping secured resources into user roles comprises:
      establishing in the data stores links to each of the secured resources within the software application;
      selecting the links corresponding to related secured resources;
      grouping the selected links into privilege sets;
      grouping privilege sets and links into user roles; and
      storing the user roles in the data stores;
   generating a plurality of surrogate identifiers in the data stores of the security brokers, each surrogate identifier being associated with one user role;
   associating users with user roles, each user being associated with one user role; and
   determining access rights to the secured resources for each user according to a corresponding surrogate identifier without disclosing the corresponding surrogate identifier to the user, the corresponding surrogate identifier being associated with the user role of the user, determining access rights further comprising:
      receiving a permissions request from a workstation and routing the permissions request to one of a plurality of security providers with one of the security brokers;
      authenticating a computer user as a valid user with one of the security providers; and
      authorizing the user to access one of the secured resources with one of a plurality of security providers.

3. A method for providing computer application security, the method comprising:
   identifying secured resources within a software application;
   grouping secured resources into user roles stored on data stores of a plurality of security brokers, wherein grouping secured resources into user roles comprises:
      establishing in the data stores links to each of the secured resources within the software application;
      selecting the links corresponding to related secured resources;
      grouping the selected links into privilege sets;
      grouping privilege sets and links into job functions;
      grouping job functions, privilege sets and links into user roles;
      and storing the user roles in the data stores;

generating a plurality of surrogate identifiers in the data stores of the security brokers, each surrogate identifier being associated with one user role;

associating users with user roles, each user being associated with one user role; and determining access rights to the secured resources for each user according to a corresponding surrogate identifier without disclosing the corresponding surrogate identifier to the user, the corresponding surrogate identifier being associated with the user role of the user, determining access rights further comprising:

receiving a permissions request from a workstation and routing the permissions request to one of a plurality of security providers with one of the security brokers;

authenticating a computer user as a valid user with one of the security providers; and authorizing the user to access one of the secured resources with one of a plurality of security providers.

4. A method for providing computer application security, the method comprising:

identifying secured resources within a software application;

grouping secured resources into user roles stored on data stores of a plurality of security brokers;

generating a plurality of surrogate identifiers in the data stores of the security brokers, each surrogate identifier being associated with one user role;

associating users with user roles, each user being associated with one user role; and determining access rights to the secured resources for each user according to a corresponding surrogate identifier without disclosing the corresponding surrogate identifier to the user, the corresponding surrogate identifier being associated with the user role of the user, determining access rights further comprising:

receiving a permissions request from a workstation and routing the permissions request to one of a plurality of security providers with one of the security brokers;

authenticating a computer user as a valid user with one of the security providers, wherein authenticating the computer user comprises:

invoking programatically an embedded component within the software application when a secured resource is accessed;

passing a resource name identifying the secured resource through the embedded component to a platform coordinator;

retrieving an identifier and a security provider name from the user via the platform coordinator;

passing the identifier and the security provider name to the security broker;

relaying the identifier to the security provider associated with the security provider name for authentication;

evaluating automatically the identifier against a data store of the security provider;

returning an authentication result to the security broker;

storing an authentication token with a time stamp in a cache of the security broker when authentication is successful, the authentication token created by the security broker based on the authentication result;

retrieving the user role associated with the identifier from the data store of the security broker;

retrieving the surrogate identifier associated with the user role from the data store of the security broker;

passing the surrogate identifier and a secured resource name from the security broker to the security provider;

evaluating automatically the surrogate identifier against the data store of the security provider;

determining automatically permissions associated with the surrogate identifier on the security provider;

returning an authorization result associated with the surrogate identifier to the security broker;

creating automatically a permissions token on the security broker based on the authorization result;

relaying the permissions token to the platform coordinator, the permissions token comprising both the secured resource and access rights;

storing the permissions token with a time stamp in a cache on the platform coordinator; and relaying the access rights to the software application through the embedded component; and authorizing the user to access one of the secured resources with one of a plurality of security providers.

5. A method for providing computer application security, the method comprising:

identifying secured resources within a software application;

grouping secured resources into user roles stored on data stores of a plurality of security brokers;

generating a plurality of surrogate identifiers in the data stores of the security brokers, each surrogate identifier being associated with one user role;

associating users with user roles, each user being associated with one user role; and determining access rights to the secured resources for each user according to a corresponding surrogate identifier without disclosing the corresponding surrogate identifier to the user, the corresponding surrogate identifier being associated with the user role of the user, determining access rights further comprising:

receiving a permissions request from a workstation and routing the permissions request to one of a plurality of security providers with one of the security brokers;

authenticating a computer user as a valid user with one of the security providers; and authorizing the user to access one of the secured resources with one of the plurality of security providers, wherein once the user is authenticated, authorizing the user comprises:

invoking programatically an embedded component within the software application when a secured resource is accessed;

passing a resource name identifying the secured resource through the embedded component to a platform coordinator;

retrieving an authentication token from a cache on the platform coordinator;

passing the authentication token and the resource name to the security broker;

comparing the authentication token against the cache on the security broker to identify a matching authentication token, the matching authentication token being associated in the cache with the surrogate identifier;

passing the surrogate identifier and the resource name from the security broker to the security provider;

evaluating automatically the surrogate identifier against the data store of the security provider;

determining automatically permissions associated with the surrogate identifier on the security provider;

returning an authorization result associated with the surrogate identifier to the security broker;

generating automatically a permissions token on the security broker based on the authorization result;

relaying the permissions token to the platform coordinator, the permissions token comprising both the secured resource and access rights;

storing the permissions token with a time stamp in a cache on the platform coordinator; and relaying the access rights to the software application through the embedded component.

6. A method for providing computer application security, the method comprising:

identifying secured resources within a software application;

grouping secured resources into user roles stored on data stores of a plurality of security brokers;

generating a plurality of surrogate identifiers in the data stores of the security brokers, each surrogate identifier being associated with one user role;

associating users with user roles, each user being associated with one user role;

determining access rights to the secured resources for each user according to a corresponding surrogate identifier without disclosing the corresponding surrogate identifier to the user, the corresponding surrogate identifier being associated with the user role of the user, determining access rights further comprising:

receiving a permissions request from a workstation and routing the permissions request to one of a plurality of security providers with one of the security brokers;

authenticating a computer user as a valid user with one of the security providers; and authorizing the user to access one of the secured resources with one of a plurality of security providers; and wherein determining access rights further comprises:

invoking programatically an embedded component within the software application when the secured resource is accessed;

passing a resource name identifying the secured resource through the embedded component to a platform coordinator;

retrieving an authentication token from a cache on the platform coordinator;

comparing the secured resource name with permissions tokens stored in the cache on the platform coordinator for a matching permissions token, the matching permissions token containing the secured resource name; and relaying access rights associated with the matching permissions token to the software application through the embedded component.

7. A method for providing computer security, the method comprising:

securing a plurality of resources within a software application;

identifying each of the plurality of resources in a data store;

selecting some of the plurality of resources;

grouping selected resources into user roles in the data store;

creating a plurality of user names and a plurality of aliases in the data store, each user name and each alias being associated with the same user role;

replicating the plurality of resources, the user roles, the plurality of user names and the plurality of aliases in a plurality of data stores; and determining access privileges to the plurality of resources using an alias corresponding to a user name by virtue of the same one user role from one of the plurality of data stores, determining access privileges further comprising:

authenticating a user on a system with one of a plurality of security providers;

authorizing access rights to secured resources in the software application with one of a plurality of security providers, wherein authorizing access rights comprises:

capturing a security call from the software application, the security call containing a name identifying a secured resource;

retrieving a user identifier;

passing the user identifier to one of a plurality of security brokers;

retrieving one of the plurality of aliases from a data store of one of the plurality of security brokers, the retrieved alias corresponding to the user identifier;

passing the retrieved alias to one of the security providers;

verifying the alias against one of the plurality of data stores on one of the plurality of security providers;

returning an encrypted permissions token to the software application; and determining access rights to the secured resource according to the permissions token; and receiving a permissions request from one of a plurality of workstations and routing the permissions request to one of the security providers with one of the plurality of security brokers.

8. The method of claim 7, wherein retrieving a user identifier comprises:

gathering information about a user for authorizing access to secured resources, the information selected from the group consisting of user name and password, software token, hardware token, and digital signature.

9. A process for authorizing access rights to secured resources in a software application, the process comprising:

authenticating a computer user to a computer security provider via a user identifier corresponding to the computer user, the computer security provider returning a result to a security broker according to the user identifier, the computer security provider being one of a plurality of security providers;

storing the result on the security broker;

retrieving a surrogate identifier from the security broker, the surrogate identifier corresponding to the result, the surrogate identifier being undisclosed to the computer user; and authorizing the surrogate identifier to the computer security provider, the computer security provider returning surrogate permissions to the security broker, the surrogate permissions corresponding to the surrogate identifier, the surrogate permissions for determining access rights to secured resources in the software application according to the surrogate permissions, wherein authorizing the surrogate identifier to the computer security provider comprises:

passing the surrogate identifier to a security manager;
querying for the surrogate identifier in a permissions list on the security provider using the security manager;
determining surrogate permissions for the surrogate identifier according to the permissions list; and
returning the surrogate permissions to the security broker; and
wherein authorizing the surrogate identifier to the computer security provider further comprises:
passing the surrogate permissions from the security broker to a platform coordinator;
storing the surrogate permissions with a time stamp in a cache on the platform coordinator;
relaying the surrogate permissions to an embedded component within the software application;
passing the surrogate permissions to a function within the software application, the function capable of interpreting the surrogate permission; and
interpreting the surrogate permission using the function to permit or deny access rights to the secured resource.

* * * * *

UNITED STATES PATENT AND TRADEMARK OFFICE
CERTIFICATE OF CORRECTION

| | | |
|---|---|---|
| PATENT NO. | : 7,131,000 B2 | Page 1 of 1 |
| APPLICATION NO. | : 09/765488 | |
| DATED | : October 31, 2006 | |
| INVENTOR(S) | : Robert L. Bradee | |

It is certified that error appears in the above-identified patent and that said Letters Patent is hereby corrected as shown below:

Column 4, Line 20, delete "fill", insert --full--

Column 10, Line 67, delete "maybe", insert --may be--

Column 12, Line 28, delete "maybe", insert --may be--

Column 17, Line 3, delete "maybe", insert --may be--

Signed and Sealed this

Sixth Day of March, 2007

JON W. DUDAS
*Director of the United States Patent and Trademark Office*